United States Patent [19]
Grasis et al.

[11] Patent Number: 6,167,171
[45] Date of Patent: Dec. 26, 2000

[54] CASCADING OPTICAL MULTIPLEXING DEVICE

[76] Inventors: Michael E. Grasis, 101 Oakwood Dr., E. Brookfield, Mass. 01515; Michael A. Scobey, 313 Robert Rd., Malborough, Mass. 01752; Derek E. Spock, 14 Washburn St., Watertown, Mass. 02172

[21] Appl. No.: 09/105,300

[22] Filed: Jun. 26, 1998

Related U.S. Application Data

[60] Provisional application No. 60/051,754, Jun. 26, 1997.

[51] Int. Cl.[7] .............................. G02B 6/28; H04J 14/02
[52] U.S. Cl. ............................................. 385/24; 359/126
[58] Field of Search ..................................... 359/124, 115, 359/118, 127, 129, 583, 587, 589, 722, 723, 126, 133; 385/24, 36, 31

[56] References Cited

U.S. PATENT DOCUMENTS

| | | | |
|---|---|---|---|
| 4,768,849 | 9/1988 | Hicks, Jr. . | |
| 5,005,935 | 4/1991 | Kunikane et al. | 385/24 |
| 5,583,683 | 12/1996 | Scobey | 359/127 |
| 5,629,995 | 5/1997 | Duck et al. | 385/24 |

FOREIGN PATENT DOCUMENTS

2 014 752   1/1979   United Kingdom .

*Primary Examiner*—Cassandra Spyrou
*Assistant Examiner*—Jennifer Winstedt
*Attorney, Agent, or Firm*—Philip G. Alden

[57] ABSTRACT

An optical multiplexing device is provided comprising multiple wavelength division multiplexers cascaded together. A first one of the wavelength division multiplexers has a common port and multiple optical ports which are optically coupled to the common port. The common port may be optically coupled to a trunk line of a system employing wavelength division multiplexing, for example, a fiber-optic telecommunication system employing 4, 8, 16 or other number of multiplexed channels. The optical ports include multiple channel ports, each of which is transparent to a corresponding wavelength sub-range and reflective of other wavelengths. The second wavelength division multiplexer has a common port optically coupled to one of the optical ports of the first wavelength division multiplexer. The second wavelength division multiplexer also has multiple optical ports which are optically coupled to its common port and include multiple wavelength-selective channel ports. A waveguide, such as a fiber-optic line, can optically connect the common port of the second wavelength division multiplexer to an optical port of the first wavelength division multiplexer. The cascaded WDMs each may be optically coupled to the output of a passive coupler and a housing may be provided defining an enclosed space in which the optical multiplexing device is mounted. Optionally, additional WDMs may be cascaded with the first two WDMs in a parallel or branched formation, an in-line formation or some combination. Preferably, the channels are interleaved, such that they are removed from the multiplexed signal in certain non-sequential order. The optical multiplexing device also may employ compound interleaving wherein adjacent channels are multiplexed by different ones of the cascaded WDMs. The optical multiplexing devices can operate to add signals, remove signals or a combination of both.

10 Claims, 9 Drawing Sheets

CASCADING OPTICAL MULTIPLEXING DEVICE

CROSS-REFERENCE TO RELATED APPLICATIONS

This application claims the benefit of priority pursuant to 35 USC §119(e)(1) and any other applicable provisions of 35 USC §119 or §120 from the Provisional U.S. patent application Ser. No. 60/051,754 filed on Jun. 26, 1997, which is incorporated herein by reference as though fully set forth.

BACKGROUND OF THE INVENTION

1. Field of the Invention

The present invention is directed to an optical multiplexing device which spatially disburses multi-channel collimated light from an optical waveguide into individual channels, each of which can be directed to an individual optical waveguide, light detector, etc., and/or multiplexes channels to a common optical waveguide or other destination. In certain preferred embodiments, the optical multiplexing devices of the present invention are particularly well suited for dense channel wavelength division multiplexing systems for fiber-optic telecommunications systems.

2. Technical Background

Wavelength division multiplexing of optical signals is finding widespread use in various fields, especially including data transmission and other telecommunication applications. The cost of new installed fiber-optic cable presents a barrier to increased carrying capacity, which can be addressed by wavelength division multiplexing. Wavelength division multiplexing allows multiple signals to be carried simultaneously by a fiber-optic line or other waveguide. Presently preferred wavelength bands for fiber-optic transmission media include those centered at $1.3\mu$ and $1.55\mu$. The latter is especially preferred because of its minimal absorption and the commercial availability of erbium doped fiber amplifiers. The useful bandwidth is approximately 10 to 40 nm, depending on application. Wavelength division multiplexing can separate this bandwidth into multiple channels. Ideally, the $1.55\mu$ wavelength band, for example, would be divided into multiple discrete channels, such as 4, 8, 16 or even as many as 32 or more channels, through a technique referred to as dense channel wavelength division multiplexing, as a low cost method of substantially increasing a waveguide's signal carrying capacity, such as long-haul telecommunication capacity over existing fiber-optic transmission lines. The International Telephony Union (ITU) Grid provides standard center wavelengths for channels in the $1.55\mu$ wavelength band, at 100 Ghz spacing (approximately 0.8 nm). Wavelength division multiplexing may be used to supply telephony and data transmission and, more and more in the future, such services as video-on-demand and other existing or planned multimedia, interactive services. Techniques and devices are required, however, for multiplexing the different discrete carrier wavelengths. That is, the individual optic signals must be combined onto a common fiber-optical waveguide and then later separated again into the individual signals or channels at the opposite end of the fiber-optic cable. Thus, the ability to effectively combine and then separate individual channels (or wavelength bands) on a fiber-optic trunk line or other optical signal source is of growing importance to fiber-optic telecommunications and other fields.

Known devices for this purpose have employed, for example, diffraction gratings, prisms and various types of fixed or tunable filters. Gratings and prisms typically require complicated and bulky alignment systems and have been found to provide poor efficiency and poor stability under changing ambient conditions. Fixed wavelength filters, such as interference coatings, can be made substantially more stable. In this regard, highly improved interference coatings of metal oxide materials, such as niobia and silica, can be produced by commercially known plasma deposition techniques, such as ion assisted electron beam evaporation, ion beam sputtering, and reactive magnetron sputtering, e.g., as disclosed in U.S. Pat. No. 4,851,095 to Scobey et al. Such coating methods can produce interference cavity filters formed of stacked dielectric optical coatings which are advantageously dense and stable, with low film scatter and low absorption, as well as low sensitivity to temperature changes and ambient humidity.

It is known to optically couple a trunk line carrying multiple channels to a common port of a wavelength division multiplexer ("WDM"—this term is used here to mean devices which combine signals, separate signals or both). Such WDM common port is, in turn, optically coupled within the WDM to multiple channel ports. Associated with each channel port is an interference filter or the like which is substantially transparent to the wavelength band of that particular channel. Thus, signals having the wavelength assigned to a particular channel are passed by the WDM through its respective channel port to and/or from the individual waveguide for that channel.

Interference filters of the Fabry-Perot type, which are preferred in various multiplexing applications, typically transmit only a single wavelength or range of wavelengths. Multiple filter units can be used together in a WDM, e.g., on a common parallelogram prism or other optical block. Multiple optical filters are joined together, for example, in the multiplexing device of U.K. patent application GB 2,014,752A to separate light of different wavelengths transmitted down a common optical waveguide. At least two transmission filters, each of which transmits light of a different predetermined wavelength and reflects light of other wavelengths, are attached adjacent each other to a transparent substrate. The optical filters are arranged so that an optical beam is partially transmitted and partially reflected by each optical filter in turn, producing a zigzag light path. Light of a particular wavelength is subtracted or added at each filter. Similarly, in the multiplexing device of European patent application No. 85102054.5 to Oki Electric Industry Co., Ltd., a so-called hybrid optical wavelength division multiplexer-demultiplexer is suggested, wherein multiple separate interference filters of different transmissivities are applied to the side surfaces of a glass block. A somewhat related approach is suggested in U.S. Pat. No. 5,005,935 to Kunikani et al, wherein a wavelength division multiplexing optical transmission system for use in bi-directional optical fiber communications between a central telephone exchange and a remote subscriber employs multiple separately located multiplexers each having separate filter elements applied to various surfaces of a parallelogram prism. Alternative approaches for tapping selective wavelengths from a main trunk line carrying optical signals on a plurality of wavelength bands is suggested, for example, in U.S. Pat. No. 4,768,849 to Hicks, Jr. In that patent multiple filter taps, each employing dielectric mirrors and lenses for removing (or adding) one channel from a multi-channel trunk line, are shown in use singly and in arrays for removing a series of channels.

Achieving the objective of multiplexing signals ever more densely presents certain problems. Light passed from a trunk line through a common port of a WDM, such as a filter-based WDM wherein the light travels generally as a so-called expanded beam for at least a portion of the distance will spread or disperse as a function of travel distance. For example, it travels within a glass optical block and/or other components of the WDM rather than in a waveguide. There are practical limits on the distance a multi-channel light beam can travel as an expanded beam before unacceptable signal degradation occurs. Current four-channel WDMs employing a zigzag expanded beam light path are effective in part because of the relatively short distance traveled by the expanded beam relative to the focal length of commercially available collimators typically used at the common port of current WDMs, before the light is passed through one or another of the channel ports, collimated and passed back into to a waveguide. Four-channel multiplexing, however, does not meet the growing need for 8 channel multiplexing systems, 16 channel systems, etc. It has not proved acceptable for many applications to simply enlarge current WDM devices to extend the zigzag expanded beam to impinge in sequence on 8 or 16 interference filters. The longer distance traveled by the expanded beam is found to cause undesirable signal degradation.

A related problem in developing WDMs of the type discussed above employing multiple filter elements mounted in parallel to an optical block, for multiplexing more than four channels, especially expanded beam WDMs using selectively transparent filter elements, lies in the difficulty of "kitting" the larger number of filter elements. Typically, a filter element for any given channel is produced with a passband which is centered imprecisely at the center wavelength for that channel. The passband of the filter element can be adjusted to be more precisely centered by changing the angle of incidence of the expanded beam on the filter element. This can be done by slightly tilting the filter relative to the light beam. In a typical WDM of this type, the multiple individual filter elements are mounted together side-by-side on one or more flat surfaces of an optical block of the WDM. Changing the input angle of the beam from the trunk line at the common port, typically by tilting the optical block, correspondingly changes the angle of incidence of the expanded beam within the WDM on the filter of not just one channel port, but of every channel port of the WDM. Thus, tilting the optical block to more precisely center the wavelength sub-range of a given channel is effective only if the filter of each other channel is imprecisely centered in the same direction and approximately the same amount relative to its respective wavelength sub-range.

For this reason, filters for a WDM are "kitted." That is, a set of filters is collected for a given WDM, all having approximately the same wavelength deviations: each is off-center in the same direction and approximately the same amount relative to its respective wavelength sub-range. The assembled WDM can then be tuned by tilting the optical block to which the filters have been mounted. This applies approximately the same correcting wavelength shifts at each channel port. Since the "kitted" filters all have approximately the same wavelength deviation, such common wavelength correction simultaneously renders each of the channel ports more precisely centered for its respective wavelength sub-range. Kitting the filters is an assembling task, however, which becomes more complex, more expensive and more time consuming as the number of filters in the kit increases. Thus enlarging a 4-port WDM to an 8-port WDM would involve an undesirable increase in assembly time, cost and complexity to collect the kits of eight filters. The problem would be far worse for a 16 channel WDM. It would be advantageous, therefore, to avoid the need to collect larger filter kits in connection with increasing the number of channels multiplexed by a system Another problem hindering the development of wavelength division multiplexing systems with greater numbers of channels involves channel spacing. As noted above, a limited band width is used in such systems, and therefore it is desirable to space adjacent channels closely together. That is the center wavelength for one channel must be closely spaced to the center wavelength of the adjacent channel on either side of it. The passband of even a high quality interference filter is imperfect, however, such that not only the desired wavelength sub-range assigned to a particular channel is passed, but also to a lesser extent adjacent wavelengths (i.e., adjacent channels) are unavoidably passed by the filter along with the desired signal for that channel. Filter quality in this regard can be measured by their so-called figure of merit ("FOM"). A good FOM means a filter has a wavelength passband with a flat top (centered at the desired wavelength) and steep sides. Currently, 40% FOM is considered good, meaning that the base of the wavelength passband (measured e.g., at 1 dB) is twice the width of the top of the wavelength passband (measured e.g., at 20 dB). Filters having a better FOM are more costly to produce and, hence, are unsuitable for many applications. In a system where the wavelength sub-range for each channel is spaced by a like wavelength width from each adjacent wavelength sub-range, a single channel interference filter with a 40% FOM is well suited to removing the desired wavelength sub-range from an expanded beam of multi-channel light. The passband of such a filter will typically have acceptably low transmittance of wavelengths which are more than about one-half channel width to either side. Such filter, therefore, is substantially reflective of the wavelength sub-range of the adjacent channels, since they are spaced a full channel width away. It is significant in this regard that various proposed dense wavelength division multiplexing schemes have voluntarily sacrificed otherwise usable bandwidth in attempting to overcome the FOM problem. Multiplexing arrangements have been suggested, employing a beam splitter to multiplex an eight-channel short band with an eight-channel long band. Even with a good FOM, several channels between the long band and short band are left unused in such suggested arrangements. Because the tops of the two adjacent passbands are wide (eight channels), the base of each is correspondingly wide, such that there is unacceptably high transmission with both of the two adjacent passbands of the intermediate wavelengths between them. Thus, the intermediate wavelengths are simply not used, resulting in the need to use instead less desirable wavelengths at the outside of the long and short bands. It is an object of the present invention to provide improved optical multiplexing devices which reduce or wholly overcome some or all of the aforesaid difficulties inherent in prior known devices. Additional objects and advantages of the invention will be apparent to those skilled in the art, that is, those who are knowledgeable and experienced in this field of technology, in view of the following disclosure of the invention and detailed description of certain preferred embodiments.

SUMMARY

In accordance with the present invention, optical multiplexing devices are provided comprising cascaded WDMs, that is, comprising multiple WDMs which are optically coupled to a common trunk line carrying multi-channel wavelength multiplexed light. The cascaded WDMs multiplex different channels or wavelength sub-ranges. The WDMs are cascaded in parallel or in series, or a combination of both, from the trunk line, each WDM adding and/or removing at least some channels or wavelength sub-ranges not handled by the other WDM(s). Preferably, an optical port of one WDM is optically coupled by a fiber-optic or other suitable waveguide to the common port of a second WDM. The optical ports of the two WDMs pass different channels or wavelength sub-ranges. The term "optically coupled" as used here in describing, e.g., that the common port of one WDM is optically coupled to an optical port of another WDM, means that an optical signal is (or can be) passed between them in one or both directions. There may be optical components positioned between two optically coupled points, such as collimators, an optical waveguide, wavelength selective filters and post filters, etc. In accordance with certain preferred embodiments, the optical multiplexing device comprises a third wavelength division multiplexer and a waveguide optically coupling the common port of such third WDM to an optical port of the first or second WDM. In yet other preferred embodiments a fourth and optionally additional wavelength division multiplexers are employed, having a common port optically coupled by a waveguide to an optical port of one of the other multiplexers. In accordance with such cascading of the WDMs, at least some of the channel ports of each of the multiple multiplexers employed in the optical multiplexing device will be substantially transparent to a channel or wavelength sub-range different from at least some of the channel ports of the other multiplexers of the device. As will be more fully understood from the discussion below of the various preferred embodiments, the wavelength sub-range of the channel ports of the cascaded WDMs may overlap. Thus, in accordance with the cascading principle disclosed here, a selected channel port of a first WDM is optically coupled to the common port of a second WDM. Typically, therefore, such selected channel port of the first WDM will be substantially transparent to a wavelength sub-range inclusive of some or all the wavelength sub-ranges of the channel ports of the second WDM. It will be understood from this disclosure, that WDMs may be cascaded in accordance with various alternative embodiments in parallel, in an in-line fashion, a branched fashion or a combination of such cascading alternative modes. In an in-line cascade, only one optical port of each cascaded WDM is directly optically coupled (i.e., not through any other intermediate WDM) to the common port of another WDM in the cascade. In a branched cascade, there is a first WDM, and the common port of each other WDM(s) in the cascade is optically coupled directly to a channel port or other optical port of the first WDM.

In accordance with one aspect, an optical multiplexing device comprises a first wavelength division multiplexer having a common port and multiple optical ports. The common port typically is adapted for optical coupling to a fiber-optic cable or other waveguide for delivering or receiving multiplexed signals passed by the common port. The multiple optical ports are, in turn, optically coupled to the common port, and include multiple channel ports each selectively transparent to a corresponding wavelength sub-range. Typically, the wavelength sub-range of each of the channel ports falls within the wavelength range passed by the common port. In many applications the common port will be non-wavelength selective. That is, it will be unfiltered or in any event transparent to all wavelengths carried by the trunk line or other waveguide to which it is optically coupled. Optionally, the optical ports of the wavelength division multiplexer further include a non-wavelength selective residual port, as discussed further below. The optical multiplexing device disclosed in accordance with this first aspect further includes a second wavelength division multiplexer having a common port and multiple optical ports substantially as described above in connection with the first wavelength division multiplexer. A waveguide optically couples an optical port of the first wavelength division multiplexer to the common port of the second wavelength division multiplexer. The respective wavelength sub-range of the first and second WDM channel ports each is different from the other. As discussed further below, a first set of channels passed by the common port of the first wavelength division multiplexer can be multiplexed by optical ports of that multiplexer, with a second subset of the channels being passed by an optical port of the first WDM to the common port of the second WDM to be multiplexed by the optical ports of the second WDM. For example, for an eight-channel multiplexing system two wavelength division multiplexers can be optically coupled in the manner disclosed here, whereby four of the eight channels are multiplexed by the first WDM and the remaining four are multiplexed by the second WDM which is cascaded with the first WDM.

It is a significant advantage of at least certain preferred embodiments, that significant reduction in assembly cost and complexity can be achieved. Most notably, the "kitting" of filters is less costly and complex. Since each of the multiple WDMs in a cascade has a smaller number of channel ports than would be required in one larger WDM, filter elements need be collected together in smaller kits. That is, fewer filters must be kitted together for each of the smaller WDMs used in a cascaded WDM arrangement in accordance with this disclosure. Consequently, the filters of a given kit can be more precisely matched to each other. That is, within cost, time and complexity constraints of a typical WDM assembly operation, filters can be better matched as to their deviation from center wavelength. The assembled WDM can, therefore, be more precisely tuned for all of its channel ports.

It is on additional surprising result of this invention that significantly reduced insertion loss can be achieved by optical multiplexing devices for 8, 16 or more channels using cascaded WDMs in accordance with this disclosure. As mentioned above, insertion loss increases with distance traveled by an expanded beam. In fact, insertion loss increases rapidly beyond the distance traveled by an expanded beam in a current four-port WDM. Whereas insertion loss may be only, e.g., 1 dB over the distance traveled in a typical expanded beam four-port WDM, insertion loss would typically increase to more than double if the zigzag expanded beam light path were extended within such WDM to eight channels (using comparable quality componentry). The deterioration significantly increases, if such WDM were enlarged to 16 channels. In typical preferred embodiments, the insertion loss associated with each cascade, that is, associated with passing multiple channels from one WDM to the next WDM may be only about ½ dB to 1 dB. Thus, by the use of cascading WDMs in accordance with this disclosure an overall reduction in insertion loss can be achieved.

In accordance with another aspect, one or more of the cascaded WDMs employed in the optical multiplexing devices disclosed here employs channel interleaving. More specifically, in a multiplexer defining at least three optical ports in sequence from the common port, a first channel port is substantially transparent to a first wavelength sub-range and substantially reflective of other wavelengths. A second channel port sequentially following the first channel port is substantially transparent to a second wavelength sub-range and substantially reflective of other wavelengths. A third port sequentially following the second channel port is substantially transparent to a third wavelength sub-range which is intermediate the first and second wavelength sub-ranges. More specifically, the third wavelength sub-range is intermediate in that the numerical value of its center wavelength is numerically greater than one and less than the other of the first and second sub-ranges. Thus, individual channels or wavelength sub-ranges are removed from a multi-channel light beam in a nonsequential order. In accordance with certain especially preferred embodiments, an interleaving mode is employed which can be referred to as compounded interleaving of the optical ports, wherein one or more channels added and/or removed by a first WDM are interleaved with other channels which are added and/or removed by a second WDM cascaded with the first WDM. Here, again, the channels are interleaved in that the respective wavelength sub-range(s) of the one or more channels of the first WDM are intermediate (by wavelength size) the sub-ranges of the channels of the second WDM. It should be understood that an interleaved channel in such compounded interleaving may actually be a multi-channel wavelength sub-range, and it may be positioned sequentially at one end of the sequence of channels handled by the optical multiplexing device. As will be apparent from the discussion below of various preferred embodiments, significant advantages can be realized through implementation of channel interleaving, especially in the context of cascaded WDMs. Notably, for example, the cost, assembly and design complexity, and insertion loss associated with post filters can be reduced. Post filters may be unnecessary at a channel port if the one or two adjacent wavelength sub-ranges have previously been removed from the multi-channel light beam. Moreover, in certain preferred embodiments in low loss and more uniform variation in signal strength can be achieved by matching the insertion loss contributed by a post filter for one channel port with the insertion loss associated with cascading other channels to a next WDM through a different channel port at which no post filter is required due to channel interleaving.

Additional features and advantages of various embodiments of the optical multiplexing devices disclosed here will be better understood from the following detailed discussion.

BRIEF DESCRIPTION OF THE DRAWINGS

Certain preferred embodiments of the invention are discussed below with reference to the accompanying drawings in which.

It should be understood that the optical multiplexing devices illustrated in the drawings are not necessarily to scale, either in their various dimensions or angular relationships. It will be well within the ability of those skilled in the art to select suitable dimensions and angular relationships for such devices in view of the foregoing disclosure and the following detailed description of preferred embodiments.

DETAILED DESCRIPTION OF CERTAIN PREFERRED EMBODIMENTS

The optical multiplexing device, as disclosed above, has numerous applications including, for example, in fiber-optic telecommunication systems. Optical multiplexing devices of this design also have application, for example, in test equipment and the like, as well as laboratory instrumentation. For purposes of illustration, the preferred embodiments described below in detail are dense channel wavelength division multiplexing devices for multi-channel fiber-optic telecommunication systems employing 8 channels, 16 channels or more. The above-described problems of signal degradation and losses due to light beam divergence, cross talk losses, etc. from adjacent channels are reduced in such fiber-optic telecommunication systems.

Transparent, when used here, means at least substantially transparent to a particular wavelength range or wavelength sub-range. Reflective, when used here, means at least substantially reflective of particular wavelength ranges or wavelength sub-ranges. Residual light, when used here, refers to the light which passes through a WDM's residual post, i.e., a non-wavelength selective optical port of the WDM, e.g., the light which passes from a WDM at the last point of a multi-point light path downstream of the last channel port. A residual port may pass no light, a single channel or multiple channels. Unless another meaning is clear from the context below, a channel means one particular channel of the multi-channel light carried by a multiplexed fiber-optic telecommunication system. A wavelength sub-range passed by a channel port of a WDM may be a single channel or multiple channels. In this regard, it will be understood from this disclosure that a channel port may pass multiple channels to another WDM in accordance with the cascading feature. A filter for a channel port of a WDM can be produced to be transparent to a wavelength sub-range encompassing multiple channels. As indicated above, multiplexing by a WDM here refers to adding channels, removing channels or both. For simplicity of explanation, only the demultiplexing functionality is described here in detail, since those skilled in the art will readily understand the correlative multiplexing functionality. That is, those skilled in the art will recognize how the same device can be employed in reverse to multiplex optical signals from the individual channels.

As is known in the fiber-optic telecommunications industry, each channel of a wavelength multiplexed system has a wavelength sub-range which is a portion of the full wavelength range of the light carried by the system. For commercial systems using the 1.55$\mu$ wavelength band, the sub-range of each individual channel typically is centered at one of the standard center wavelengths provided in the ITU Grid. As mentioned above, the ITU Grid gives standard center wavelengths at 100 Ghz spacings. In any particular fiber-optic system, depending on the selected spacing of adjacent channels, each channel's center wavelength will be one, two or more 100 Ghz units removed from the center wavelength of the adjacent channel on either side. The first and last channel will, of course, have only a single adjacent channel.

Those skilled in the art, that is those with knowledge or experience in this technology, will recognize that a certain unavoidable overlap, or cross talk, occurs from each channel to the other channels. As noted above, this occurs because of the inability of a WDM to separate one channel perfectly from the multiplexed signal. In a WDM using Fabry-Perot type interference filters, better signal isolation can be achieved using a filter having a higher figure of merit. A filter with a greater number of cavities typically will have a higher FOM than an otherwise comparable filter with fewer cavities, but also is more expensive to produce and causes increased insertion loss. Post filters also can improve signal isolation, but also add cost and increase insertion loss. Signal contamination is naturally greater from channels that are adjacent to one another. Thus, although a third channel will have some overlap with the first channel, it is typically much less than that occurring with the adjacent second and fourth channels. As now described with reference to certain preferred embodiments, improved signal isolation with reduced insertion loss can be achieved using cascaded WDMs, especially in connection with interleaving. Of course, better quality filters and/or post filters, etc., can be used in conjunction with the cascading and interleaving features disclosed here, to achieve corresponding further improvements in system performance.

Numerous different WDMs are commercially known and suitable for use as cascaded WDMs in the optical multiplexing devices disclosed here. In accordance with certain preferred embodiments, WDMs are employed comprising an optical block carrying Fabry-Perot interference filters, and optionally other reflective elements, such as broadband high reflectance mirror elements, to define a multi-bounce, zigzag expanded beam light path through the optical block. The optical block can comprise a solid, optically transparent glass, for example, or define an air gap between parallel opposite sides to which the filter elements are mounted. Optical blocks of the later type are disclosed in commonly owned U.S. patent application Ser. No. 08/800,963 filed Feb. 14, 1997, entitled Multiplexing Device with Precision Optical Block, the disclosure of which is hereby incorporated by reference. WDMs also can be employed, wherein multiple channel ports along a multi-bounce zigzag expanded beam light path are formed at spaced locations of a continuously variable filter element mounted to an optical block. Suitable such WDMs are disclosed in commonly owned U.S. Pat. No. 5,583,683 to Scobey, entitled Optical Multiplexing Device. Suitable alternative WDM configurations will be apparent to those skilled in the art given the benefit of this disclosure. The filters used in the cascaded WDMs preferably are dielectric, multi-cavity, most preferably three cavity, film stack coatings of the type commonly known in the optics industry as Fabry-Perot cavity filters, often referred to simply as cavity filters. Two dielectric thin film stacks which by themselves form a reflector for the optical wavelengths in question, are separated by a thicker cavity layer. This structure is then repeated one or more times to produce a filter with enhanced blocking and improved in-band transmission flatness. The net effect is to produce a narrowband transmissive filter where in-band light is transmitted and out-of-band light is reflected. Dichroic filters may also be used. This improved filter performance provides commercially acceptable dense channel wavelength division multiplexing for fiber-optic telecommunications applications of the optical multiplexing device. Multi-cavity interference filters can be produced with dense, stable metal oxide film stacks using the deposition techniques mentioned above. Such filters in preferred embodiments have excellent thermal stability at 1550 nm and ultra-narrow bandwidths, separated by as little as 2 nm, or even as little as 1 nm or less. Stable ultra-narrowband filters are shown in SPIE Proceedings 7/1994. High-quality interference filters comprising stacked layers of metal oxide materials, such as e.g., niobia and silica, can be produced on suitable optical substrate, such as optical glass, fused silica, etc., e.g., the BK series (such as BK1, BK3 and BK7), SSK1, WG320 and RG1000 available from Schott Glaswerke (Mainz, Germany) and any suitable Pyrex® optical glass from Corning, Inc. (Corning, N.Y., U.S.A.). The filters can be formed by commercially known plasma deposition techniques, such as ion assisted electron beam evaporation, ion beam sputtering, and reactive magnetron sputtering, for example, as disclosed in U.S. Pat. No. 4,851,095 to Scobey et al., and U.S. Pat. No. 5,525,199 to Scobey the entire disclosure of both these patents being hereby incorporated by reference. Such coating methods can produce interference cavity filters formed of stacked dielectric optical coatings which are advantageously dense and stable, with low film scatter and low absorption, as well as low sensitivity to temperature changes and ambient humidity. Suitable filters are disclosed also in U.S. Pat. No. 4,957,371 to Pellicori et al. Suitable alternative filter elements and the like will be apparent to those skilled in the art in view of this disclosure.

Figure 1:
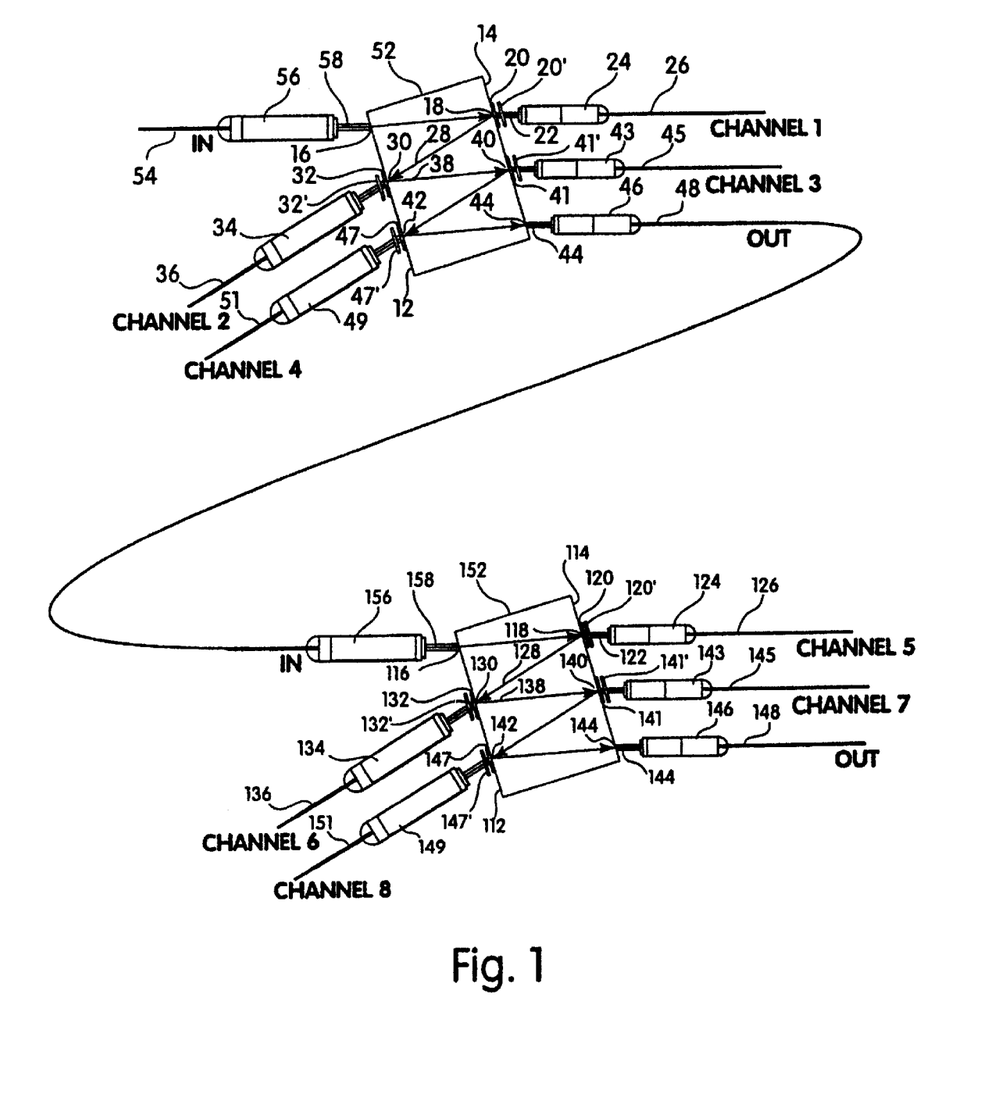
FIG. 1 is a schematic illustration of an optical multiplexing device in accordance with one preferred embodiment comprising two cascaded wavelength division multiplexers.

Referring now to the preferred embodiments illustrated in the drawings, the optical multiplexing device of FIG. 1 is seen to comprise cascaded WDMs, including first optical block 52 and second optical block 152. An optical waveguide 54, e.g., optical fiber suitable for carrying a multi-channel optical signal, communicates with means for projecting collimated light, such as a fiber-optic GRIN lens collimator 56 or the like. Collimator 56 couples highly collimated light 58 to the optical block 52 at a slight angle through common port 16 in first surface 12 of the optical block. Second surface 14 of optical block 52 is spaced from and substantially parallel to first surface 12. Thus, multi-channel light carried by optical fiber 54 (preferably a single mode fiber) is collimated by collimator 56 and directed through common port 16, from which it passes through optical block 52, striking second surface 14 at channel port 18. Filter 20, located at channel port 18, is transparent to a sub-range of the wavelengths included in the collimated light 58. Specifically, light 22 corresponding to channel 1 of the telecommunication system passes through channel port 18 of the optical block 52 preferably to a collimator 24 associated with a first signal channel. A post filter 20' is mounted between channel port filter 20 and collimator 24. Post filter 20' optionally is substantially identical to filter 20. It provides greater signal isolation along with certain insertion loss. The optical signal passed by channel port 18 is thereby transmitted as channel 1 to an optical fiber, preferably single mode fiber 26, as a demultiplexed signal. The filter 20 at channel port 18 is reflective of wavelengths which are not "in-band" of the filter. This reflected light 28 is, therefore, reflected from second surface 14 of the optical block 52 back to a second channel port 30 at first surface 12. Interference filter 32 at channel port 30 is transparent to a different wavelength or sub-range of wavelengths than that of filter 20 at channel port 18. For dense channel wavelength division multiplexing applications, the wavelength separation between each of the multiple ports spaced along first and second surfaces 12 and 14 is preferably about 1.6 nm or less. Thus, at channel port 30 an optical signal corresponding to a second channel is transmitted through the filter 32 and post filter 32' to a collimator 34, and from there to fiber-optic carrier 36 as channel 2. As at the first channel port 18, the filter 32 at channel port 30 reflects light which is not in-band at that location. Thus, the remaining portion 38 of the collimated light 58 which first entered the optical block 52 at common port 16 is reflected back from port 30 to a third channel port 40 on second surface 14. Interference filter 41 at channel port 40 is transparent to yet a different wavelength or sub-range of wavelengths than that of filters 20 and 32. Thus, filter 41 transmits an optical signal through post filter 41' to collimator 43 and from there to fiber-optic carrier 45 as channel 3. From channel port 40 the light which is not in-band is reflected or bounced back to a fourth channel port 42 on first surface 12. Interference filter 47 at channel port 42 is transparent to a different wavelength or sub-range of wavelengths than that of filters 20, 32, and 41. Thus, filter 47 transmits an optical signal through post filter 47' to collimator 49 and from there to fiber-optic carrier 51 as channel 4. The light which is not in-band of filter 47 is then reflected to unfiltered residual port 44 on second surface 14 where the remaining light exits optical block 52, passes to a collimator 46, and then to fiber-optic carrier or other waveguide 48. The reflected wavelengths therefore are seen to pass through WDM 52 in a zigzag multi-point light path, with the optical signal for each individual channel being removed by successive bounces at first and second surfaces 12 and 14 until the light reaches residual port 44.

While preferably the interference filters are reflective of all wavelengths which are not in-band at each of the multiple channel ports, in certain embodiments each could be reflective only of the wavelengths of optical signals which had not been extracted at an upstream channel port, that is, at a channel port encountered previously along the multi-point light path. Also, those skilled in the art will understand from this description that the optical multiplexing device of FIG. 1 is equally suitable for use in combining the optical signals of the four individual channels. Thus, the residual port 44 and/or the multiple channel ports in first and second surfaces 12 and 14 would be input ports, and common port 16 would be an output port to trunk line 54. The zigzag expanded beam light would then, at least in part, proceed downstream from the bottom (as viewed in FIG. 1) of the optical block 52 toward the top.

The common port 116 located on the first surface 112 of second optical block 152 is optically coupled directly to residual port 44. Optical fiber 48, carrying the residual light from residual port 44, carries light to collimator 156 of second optical block 152. Collimated light 158 enters second optical block 152 at common port 116. Second optical block 152 operates to pass collimated light 158 along a multi-point expanded beam light path in a manner similar to optical block 52. Channel port 118 on second surface 114 has filter 120 and post filter 120' which transmits an optical signal through collimator 124 to optical fiber 126 as channel 5. Reflected light 128 strikes channel port 130 where a selected wavelength sub-range is transmitted by filter 132 and post filter 132' through collimator 134 to optical fiber 136 as channel 6. Reflected light 138 strikes channel port 140 where it is partially transmitted by filter 141 and post filter 141' through collimator 143 to optical fiber 145 as channel 7. The reflected light from channel port 140 is partially transmitted by filter 147 and post filter 147' at channel port 142 through collimator 149 to optical fiber 151 as channel 8. The remaining light, if any, is reflected at channel port 142 and passes through unfiltered (and, therefore, non-wavelength selective) residual port 144 and collimator 146 to optical fiber 148.

It is to be appreciated that the number of channel ports in any of the present optical multiplexing devices can vary, for example, from two, to four, to eight, and even more. By constructing such an optical multiplexing device with four-port WDMs, however, a significant advantage can be realized. Light beam divergence increases as the light beam travels along the multi-point light path within the optical multiplexing device. Placing a collimator at the residual port 44 of the first of the cascaded WDMs collimates the light again, and cascading two such four-port WDMs results in less loss due to such beam divergence than would a comparable single 8-port WDM. It is a significant advantage realized by the optical multiplexing devices with cascaded WDMs disclosed here, that the signal degradation, i.e., insertion loss, etc., caused by a cascade connection of one WDM to another, typically only about ½ dB to 1 dB using optical components currently commercially available, is less than the signal degradation which would occur in an expanded beam WDM enlarged to 8 or 16 channel ports. The advantage is even greater when a cascade of three or four WDMs is compared to a comparable single WDM enlarged to 16 channel ports.

It will be recognized by those skilled in the art that the optical multiplexing device illustrated in FIG. 1 can provide highly efficient and compact multiplexing and demultiplexing functionality. The optical block can have a width, e.g., of about 14.5 mm and a height of about 5.5 mm. Linear spacing of the optical ports on each of surfaces 12 and 14 can be, for example, about 3.0 mm, with an overall linear dimension of approximately 21.6 mm for the optical block. Generally, it is preferred in devices of the type discussed here, to have a low entry angle or tilt angle (where zero degrees would be normal to the surface of the optical block) at which light passes through the common port 16 (measuring the angle of the light outside the optical block) to reduce polarization dependent effects. It also reduces adverse effects of collimated light divergence on filter performance, since a lower entry angle results in more closely spaced bounce points within the optical block and, therefore, a shorter travel path for the light. Typically, the entry angle is less than 30, being preferably from 4 to 15, more preferably 6 to 10, most preferably about 8.

Typical specifications for an optical multiplexing device in accordance with a preferred embodiment of FIG. 1 are shown in Table A, below.

TABLE A

| Number of Channels | 8 |
| --- | --- |
| Channel Center Wavelengths | ITU Grid (192.1 THz reference) |
| Channel Spacing | 200 Ghz |
| Channel Bandwidth | 80 Ghz |
| Max Insertion Loss | <4 dB |
| In-Band Insertion Loss Variation | <1 dB |
| Isolation | <−25 dB |
| Back Reflection | <−45 dB |

Figure 2:
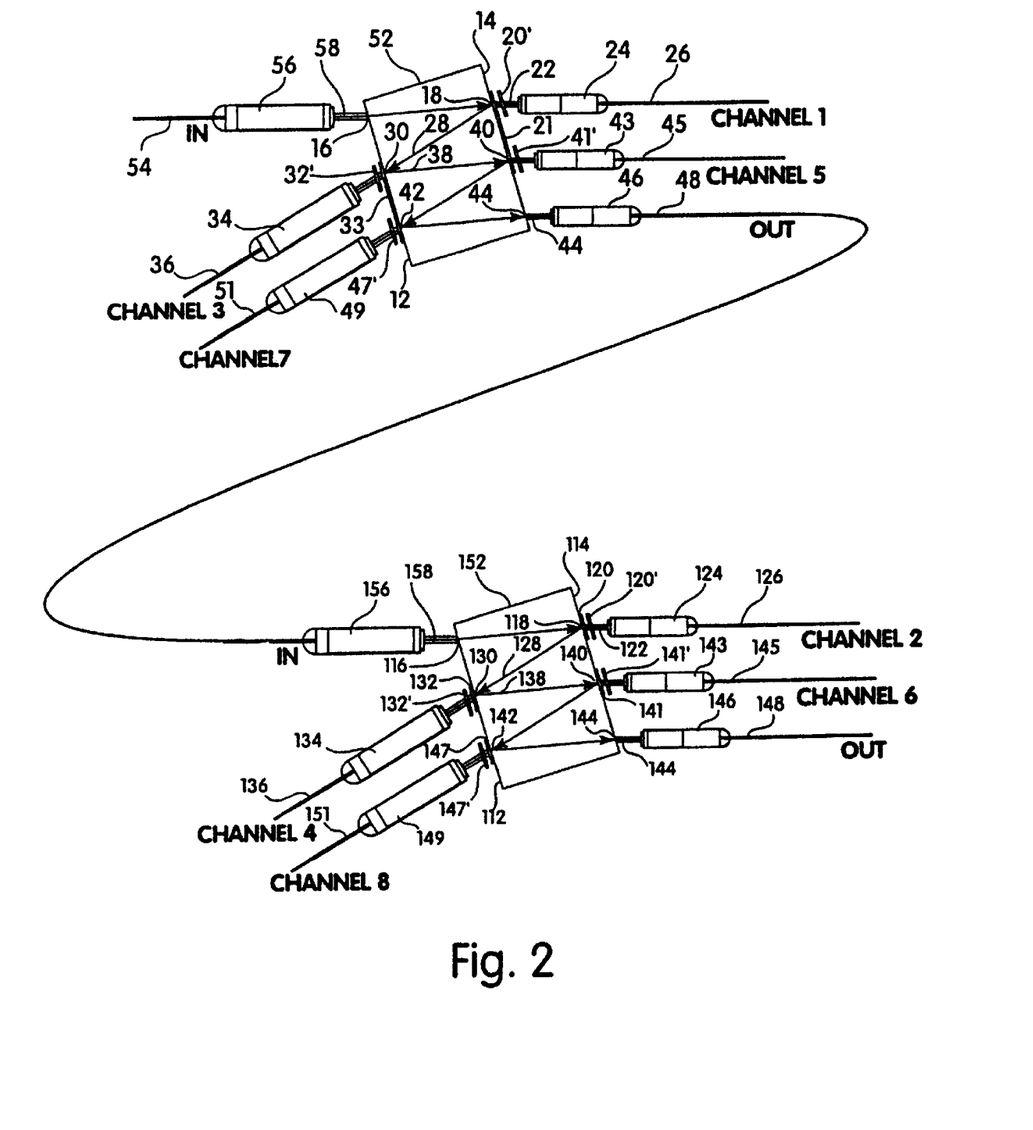
FIG. 2 is a schematic illustration of an optical multiplexing device in accordance with an alternative preferred embodiment, showing two cascaded wavelength division multiplexers each employing channel interleaving.

In Table A "Max Insertion Loss" is the largest insertion loss permitted for any channel in the device, and "In-Band Insertion Loss Variation" is the maximum permitted difference between the insertion loss experienced by any one channel and the loss experienced by any other channel of the device Another preferred embodiment is shown in FIG. 2. A single, continuous, variable thickness multi-cavity interference filter 21 may be provided on second surface 14 to provide filtering at channel ports 18 and 40. Filter 21 is most preferably a continuous linearly variable filter. Filter 21 is transparent at channel port 18 to a sub-range of wavelengths included in the collimated light 58. The light 22 passes in turn as channel 1 to collimator 24 and single mode fiber 26. The continuous filter 21 at channel port 18 is reflective of wavelengths that are not "in-band" of the filter at that location. The light 28 reflected by continuous filter 21 at first channel port 18 strikes first surface 12 at broadband high reflector 33 where it reflects back all wavelengths as remaining light 38 to channel port 40 at second surface 14. At channel port 40, the continuous, variable thickness, multi-cavity interference filter 21 is transparent to a different wavelength or sub-range of wavelengths than it is at channel port 18, and thus transmits channel 5 to collimator 43 and optic fiber 45. Filter 21 additionally reflects wavelengths that are not in-band back to reflector 33 on first surface 12 which in turn reflects all wavelengths of the light back to residual port 44 at second surface 14. A continuous, variable thickness filter referred to above is more completely described in U.S. Pat. No. 5,583,683 to Scobey, the disclosure of which is incorporated herein by reference. It is to be appreciated that the multiple channel ports can comprise any combination of interference filters and reflector elements, each of which are positioned along the multi-point light path to cascade the collimated light throughout the optical multiplexing device. An end cap (not shown) can optionally be located at residual port 44, to prevent transmission of any light out of the optical block at that port. The end cap alternatively can be provided at any of the channel ports, and is preferably removable so as to provide future expansion by adding a filter, reflector, or other component in its place.

Several advantages will be recognized from the foregoing description of the preferred embodiments of FIGS. 1 and 2. With respect to the embodiment of FIG. 1, it can be seen that the two cascaded WDMs employed in the optical multiplexing device can be substantially identical in construction, thereby reducing the cost and complexity of the optical multiplexing device. Typically, of course, the two cascaded WDMs employ filter elements which differ, so as to pass the different wavelength sub-ranges corresponding to their different channels, etc. Alternatively, in certain preferred embodiments (particularly those employing interleaving, disclosed above and further discussed below), it will be possible to use identical WDMs, simply tilting each at a different angle relative the direction of light passing through its common port. This produces an angle of incidence of the light beam on the channel ports of one WDM which differs from the angle of incidence on the channel ports of the other WDM, and thereby yields different passbands corresponding to the different channels being multiplexed by the system. Similarly, the second WDM in the embodiment of FIG. 2 could be substantially identical to the first WDM. Rather than the individual filter elements shown, such second WDM could employ continuous filters as are used in the first WDM. In that case, the passbands of the correspondingly located channel ports of the second WDM can be made to differ from the passbands of the channel ports of the first WDM by differential tilting, as mentioned immediately above, or by employing continuous filter elements having different light transmission properties, or by using substantially identical continuous filter elements which are simply shifted as to their mounting position on the optical block, so as to cause the channel ports to occur at different locations on the filter in the second WDM than in the first WDM. It should also be recognized that an advantage is realized through the use of four-port WDMs in the preferred embodiments of FIGS. 1 and 2. Specifically, only six collimators per WDM are required. Thus, six collimators serve to multiplex four channels and, accordingly, a total of twelve collimators are required to multiplex eight channels.

Figure 3:
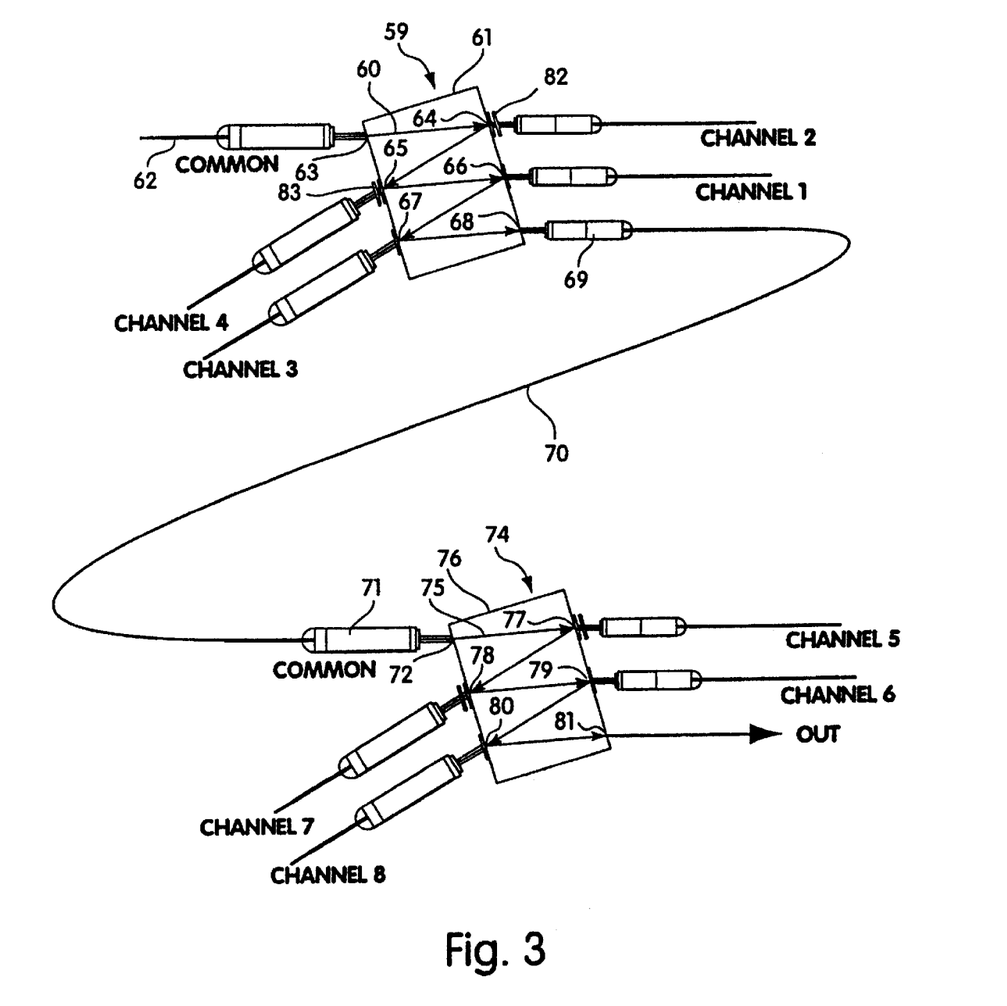
FIG. 3 is a schematic illustration of an optical multiplexing device in accordance with an alternative preferred embodiment.

In the alternative preferred embodiment illustrated in FIG. 3, each of the two cascaded WDMs employs the additional feature of channel interleaving. Specifically, WDM 59 is seen to define a light path 60 within an optical block 61. A wavelength division multiplexed signal carried on trunk line 62 of a fiber-optic telecommunications system, corresponding to channels 1 through 8, passes through common port 63 to a sequentially first channel port 64. It should be understood that as used in this disclosure and in the appended claims, wavelength size for a sequence of channels increases or decreases progressively, corresponding to the channel number. Thus, while an actual working system within the scope of the invention may well assign any channel number to any wavelength sub-range, the explanation here of the interleaving feature of the invention will, for the sake of simplicity and clarity, use the convention that the wavelength of the signal corresponding to channel 2 is larger than the wavelength of the signal corresponding to channel 1; the wavelength of the signal corresponding to channel 3 is larger than the wavelength of the signal corresponding to channel 2; etc. (Alternatively, of course, the wavelength sequence could as easily have been assigned to the channel number sequence in reverse order.) As will now be more fully understood, interleaving does not depend on the channel number actually assigned to any given channel, but rather on the sequence in which adjacent and intervening wavelength sub-ranges of a multi-channel signal are multiplexed.

Referring again to the embodiment of FIG. 3, it can be seen that channel port 64 passes the signal corresponding to channel 2. Channel port 65 sequentially follows channel port 64 along light path 60 and passes the signal corresponding to channel 4. Channel port 66 follows channel port 65 and passes the signal corresponding to channel 1. Channel port 67 then follows channel port 66 and passes the signal corresponding to channel 3. Thereafter, the residual light passes through unfiltered optical port 68 into collimator 69. Fiber-optic waveguide 70 carries the residual signal from collimator 69 to collimator 71 and the common port 72 of second WDM 74. Light path 75 within optical block 76 is a multi-point, zigzag, expanded beam light path substantially identical to that of optical block 61. Channel port 77 passes the signal corresponding to channel 5. Channel port 78 follows channel port 77 and passes the signal corresponding to channel 7. Channel port 79 follows channel port 78 and passes the signal corresponding to channel 6. Channel port 80 follows channel port 79 and passes the signal corresponding to channel 8. Thereafter, any residual light passes through optical port 81. Channel interleaving is accomplished in first wavelength division multiplexer 59. Channel 1, which is an end channel having only one channel adjacent to it, specifically channel 2, is removed after channel 2. Similarly, channel 3 is removed after both its adjacent channels, channels 2 and 4, have already been removed. Notably, post filters 82, 83 are used at channel port 64 and 65, respectively, whereas no post filters are used at channel ports 66 and 67.

Post filters can be deleted from channel ports 66 and 67, because in each case adequate signal isolation is achieved without the use of a post filter. In accordance with the principles discussed above, good signal isolation can be achieved at selected channel ports without the use of a post filter, because the adjacent wavelengths have already been substantially removed by the earlier channel ports. A post filter is not required at channel port 66 (passing channel 1), for example, to adequately exclude the signal corresponding to channel 2, since the wavelength sub-range of channel 2 was already sufficiently removed from the expanded beam prior to channel port 66 at channel port 64. Nor is a post filter required at channel port 66 to remove (i.e., to exclude) the signal of channel 3, even though channel 3 remains at that point in the expanded beam, because the wavelength sub-range of channel 3 is remote from (i.e., non-adjacent to) the wavelength sub-range of channel 1. Channel port 66 will, therefore, adequately exclude the signal of channel 3 even without the use of a post-filter, by employing merely a single, high-quality filter, preferably a multi-cavity (e.g., 3–5 cavity) Fabry-Perot type interference filter. Similarly, no post filter is required at channel port 67 (passing channel 3), since adjacent channels 2 and 4 have already been removed. Even though the signal corresponding to channel 5 remains in the light beam at that point, the wavelength sub-range of channel 5 is sufficiently remote from the wavelength sub-range of channel 3. Thus, when all adjacent channels have previously been removed (i.e., the one channel adjacent to an end channel or the two channels adjacent to a non-end channel), excellent signal isolation can be achieved without the use of a post filter. Both the cost and insertion loss associated with a post filter can be avoided, therefore, for a number of the channels multiplexed by preferred embodiments of the optical multiplexing device disclosed here employing interleaving. Significant reduction can be achieved in both component costs and assembly cost and complexity by such reduction in the number of required post filters.

The second wavelength division multiplexer 74 in FIG. 3 is seen to employ post filters only for channel ports 77 and 78. Here, again, a post filter is employed at the sequentially first channel port 77 because the adjacent wavelength sub-range corresponding to channel 6 has not yet at that point been removed from the signal. A post filter is employed at the next channel port 78, at which channel 7 is removed from the light, because adjacent channel 8 has not as yet been removed. No channel port is used at channel ports 79 and 80, since in both cases the wavelength sub-ranges adjacent to the desired wavelength sub-range have already been removed. Thus, again, significant cost and complexity reduction is achieved.

Figure 4:
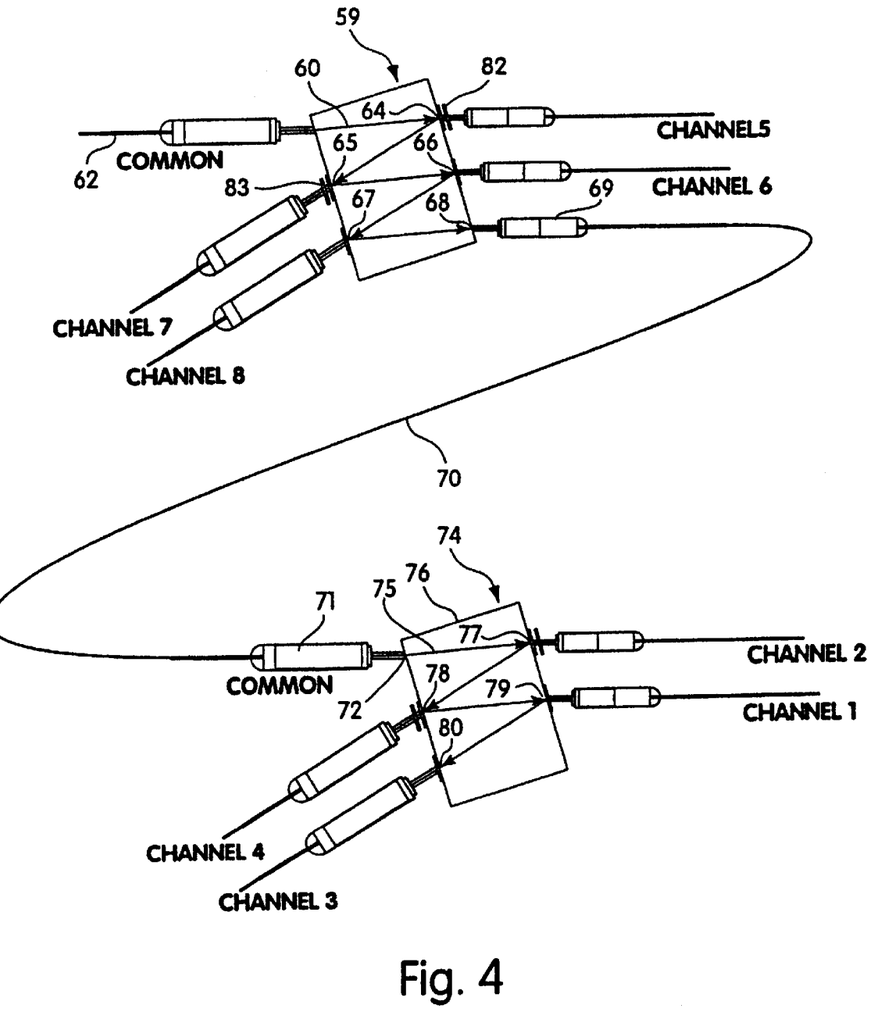
FIG. 4 is a schematic illustration of an alternative preferred embodiment.

In the preferred embodiment illustrated in FIG. 4, an alternative channel interleaving arrangement is seen. The reference numbers employed for the embodiment of FIG. 3 are used for the corresponding components in the embodiment of FIG. 4. By changing the wavelength sub-ranges passed by each of the channel ports of the first and second wavelength division multiplexers 59, 74, channels 5 through 8 are removed—with channel interleaving—by the first WDM 59 and channels 1 through 4 are removed—with channel interleaving—by second WDM 74. Channel interleaving in this alternative channel arrangement is seen to achieve the same reduction in the use of post filters as the embodiment of FIG. 3. Accordingly, comparable cost and complexity reduction can be realized.

Figure 5:
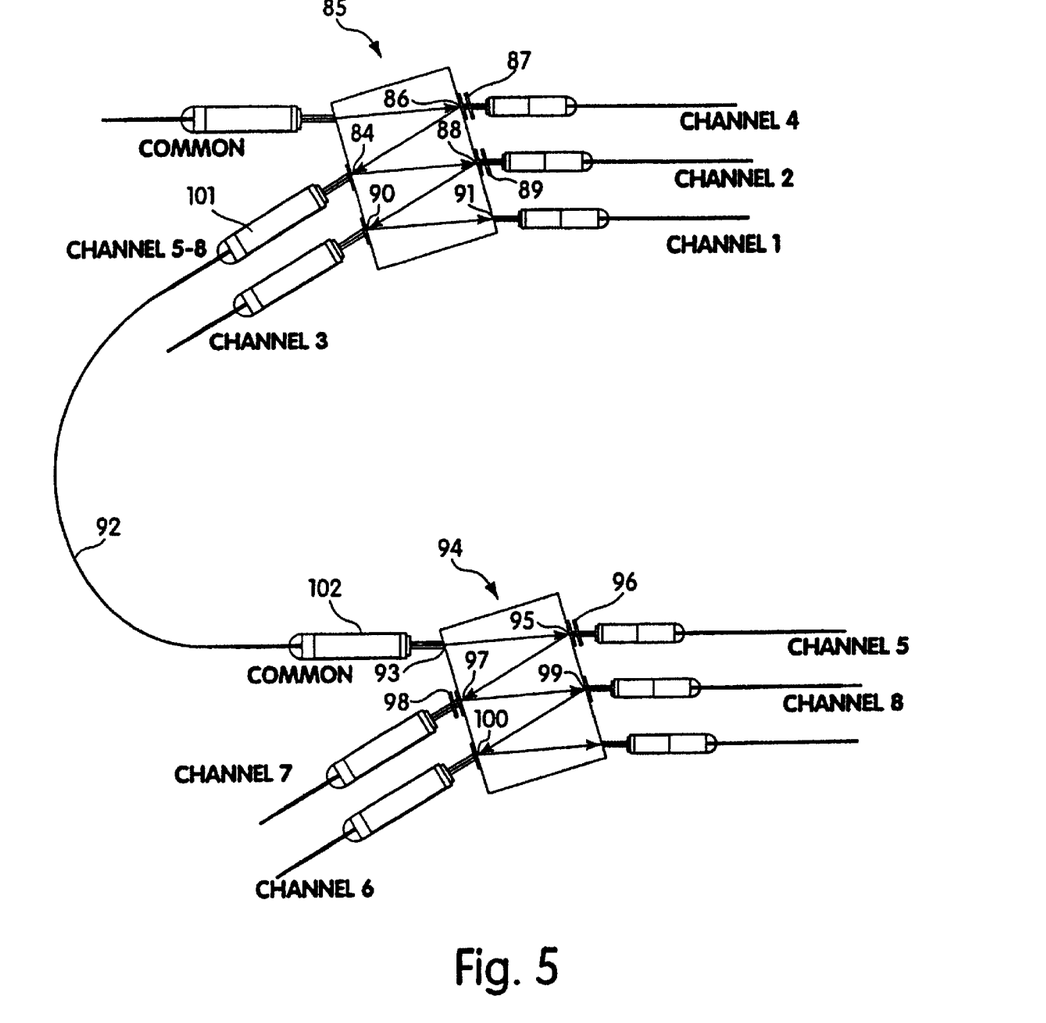
FIG. 5 is a schematic illustration of an alternative preferred embodiment.

An alternative preferred embodiment of an optical multiplexing device in accordance with the present disclosure is illustrated in FIG. 5. This embodiment may be referred to as a "drop cascade" arrangement. It is characterized in that a channel port 84 of first cascaded WDM 85 passing a wavelength sub-range spanning multiple channels, specifically channels 5 through 8 in the particular embodiment illustrated, follows sequentially a channel port 86 which passes a more narrow wavelength sub-range, for example, single channel 4 in the illustrated embodiment. More generally, a drop cascade arrangement in accordance with certain preferred embodiments disclosed here removes a wavelength sub-range (which may be referred to as an "end range") immediately after removing a single channel or other wavelength sub-range which is between the end-range and the multi-channel remainder of the trunk line signal. In preferred embodiments, a multi-channel signal spanning a wavelength sub-range which includes an end channel and one or more channels sequentially following the end channel is removed at a second channel port, after a first channel port of the WDM removes the channel which is next in sequence. In accordance with the principles discussed above, a post filter 87 is employed at channel port 86, whereas no post filter is required at channel port 84. The multi-channel wavelength sub-range passed by channel port 84 has no wavelength sub-range adjacent to channel 8 (since the system is an 8 channel multiplexed system) and no channel adjacent its lower end at channel five (since channel 4 has previously been removed). Channel port 88 follows channel port 84 and removes a single channel, specifically, channel 2. Channel port 88 employs post filter 89, since adjacent channel 3 has not as yet been removed from the light beam traveling through WDM 85. Channel port 90 follows channel port 88 and removes channel 3. Since both adjacent channels, channels 2 and 4, have previously been removed, no post filter is employed at channel port 90. Similarly, no post filter is employed at channel port 91 to remove channel 1, since adjacent channel 2 has previously been removed. Channel 1 is an end channel, i.e., it occurs at one end of the wavelength range handled by the 8 channel system in which the drop cascade optical multiplexing device of FIG. 5 is employed and, accordingly, there is no channel adjacent to channel 1 on the side opposite channel 2. Waveguide 92 carries the multi-channel signal passed by channel port 84 to the common port 93 of the cascaded second WDM 94. Channels 5 through 8 are multiplexed by WDM 94 with channel interleaving as shown. Specifically, channel 5 is first removed at channel port 95 with the use of a post filter 96 since adjacent channel 6 has not as yet been removed from the multi-channel signal. Channel 7 is removed at channel port 97 with a post filter 98 since adjacent channels 6 and 8 remain in the signal. Channel 8 is removed by channel port 99. No post filter is employed at channel port 99, since adjacent channel 7 has been previously removed. There is no channel adjacent to channel 8 on the side opposite channel 7, since as noted above the system is an 8 channel system. Finally, channel 6 is removed at channel port 100. Here, again, no post channel is employed since the channels adjacent to channel 6 have previously been removed.

Figure 6:
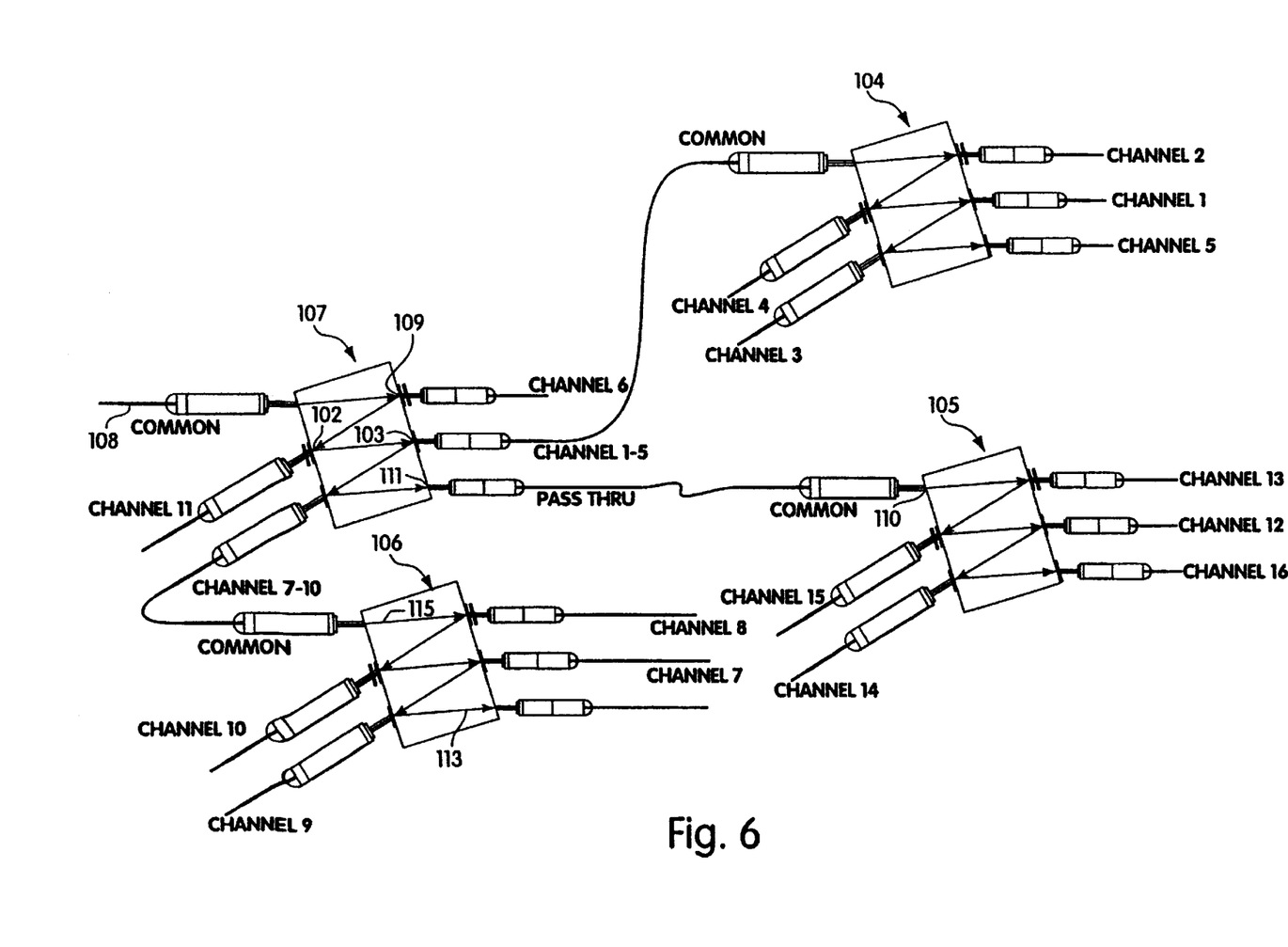
FIG. 6 is a schematic illustration of an alternative preferred embodiment employing four cascaded WDMs employing channel interleaving.

The optical multiplexing devices of the embodiments illustrated in FIGS. 1 through 5 each has employed a pair of WDMs cascaded together, some with interleaving and some without, for multiplexing an 8 channel system, such as an 8 channel fiber-optic telecommunication system. An optical multiplexing device is illustrated in FIG. 6 for a 16 channel system. Four WDMs are employed in a branch cascading arrangement, wherein three of the WDMs 104–106 are connected in parallel to the other WDM 107 which is, in turn, connected to a fiber-optic or other waveguide trunk line 108 carrying the 16 channel multiplexed signal. The optical multiplexing device of FIG. 6 is well suited to dense wavelength division multiplexing for a fiber-optic telecommunication system. It will be appreciated, of course, that another optical multiplexing device comparable to that illustrated in FIG. 6 would be advantageously employed at one or more other locations along trunk line 108. The optical multiplexing device of FIG. 6 is seen to employ several of the features discussed above in connection with other embodiments. Specifically, interleaving is employed at each of the four WDMs, such that post filters are used only at selected channel ports and not at other channel ports. Compound interleaving is not employed in the embodiment of FIG. 6, although it will be readily apparent to those skilled in the art in view of this disclosure, especially the discussion of the embodiment of FIG. 4 above in which compound interleaving is employed, that this feature also could be used in the 16 channel device of FIG. 6. The WDM 107 is seen also to employ the drop cascade feature discussed above in connection with FIG. 5. Specifically, a multi-channel end range is passed by channel port 103 which sequentially follows channel port 109 at which a single adjacent channel, channel 6, is removed. (Channel port 102 is seen to occur between channel ports 109 and 103). Also notable is that such multi-channel signal passed to common port 110 of WDM 105 comes from an optical port 111 of WDM 107 which is a residual port. That is, optical port 111 is a non-wavelength selective optical port. Optical port 113 at the end of light path 115 in WDM 106 is seen to be a non-wavelength selective residual port to which no channel is assigned. It will be recognized that an additional channel could be handled by the optical multiplexing device of FIG. 6 at this port. It is also notable in connection with the WDM 107, that removal of channels 6 and 11 can be accomplished without unacceptable degrading of the signal of adjacent channels, because each can be taken out from the multiplexed signal using a single channel, narrowband filter. Employing a filter with a figure of merit of at least about 40% to remove a single channel will result in good signal isolation for the desired channel with advantageously low transparency to the adjacent channels. Likewise, notwithstanding that the other three optical ports of WDM 107 pass multi-channel wavelength sub-ranges, the channels adjacent to such multi-channel wavelength sub-ranges are not degraded because they have previously been removed.

Figure 7:
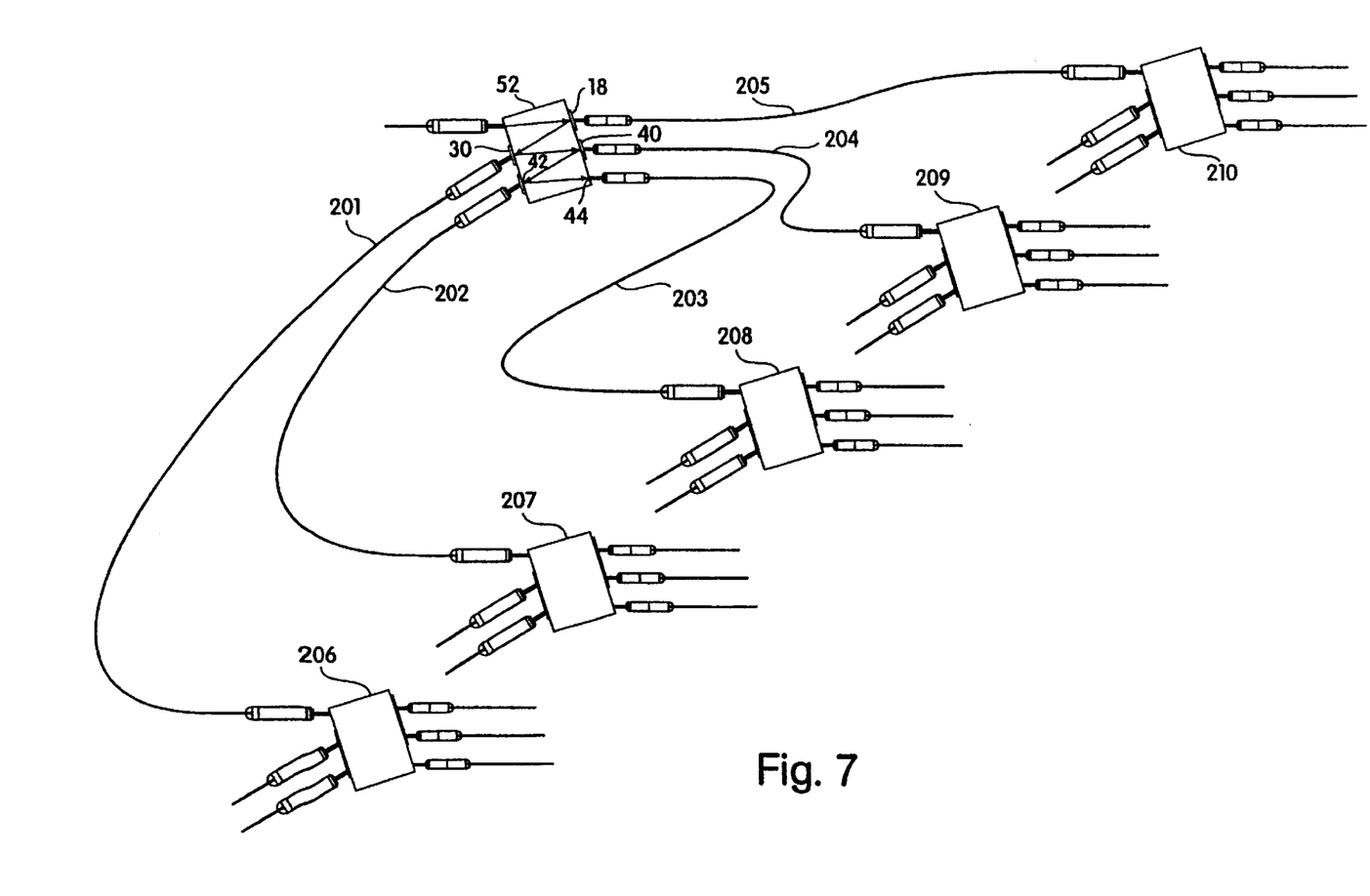
FIG. 7 is a schematic illustration of an optical multiplexing device employing six cascaded WDMs.

The optical multiplexing device illustrated in FIG. 7 employs a WDM 52 constructed in accordance with the description provided in connection with the embodiment of FIG. 1, above. In the embodiment of FIG. 7, however, each of the optical ports of WDM 52 passes a multi-channel signal to another WDM. Thus, optical port 30 passes a multi-channel signal via fiber-optic line 201 to the common port of WDM 206. Similarly, channel port 42 of WDM 52 passes a multi-channel signal via fiber-optic line 202 to the common port of WDM 207; channel port 18 passes a multi-channel signal via fiber-optic line 205 to WDM 210; channel port 40 passes a multi-channel signal via fiber-optic line 204 to WDM 209; and, finally, optical port 44 which is a non-wavelength selective residual port, passes a multi-channel signal via fiber-optic line 203 to WDM 208. Thus, each of the optical ports of WDM 52 passes a multi-channel signal to one of a set of parallel WDMs which are optically coupled to WDM 52. Each of the parallel cascaded WDMs has multiple optical ports including multiple channel ports. Each of the optical ports of the parallel cascaded WDMs may, in turn, pass a single channel or a wavelength sub-range comprising multiple channels. It will be recognized that in the latter case a third and even fourth or subsequent tier of WDMs may be cascaded together with those shown in FIG. 7 to achieve multiplexing of even higher numbers of channels.

Figure 8:
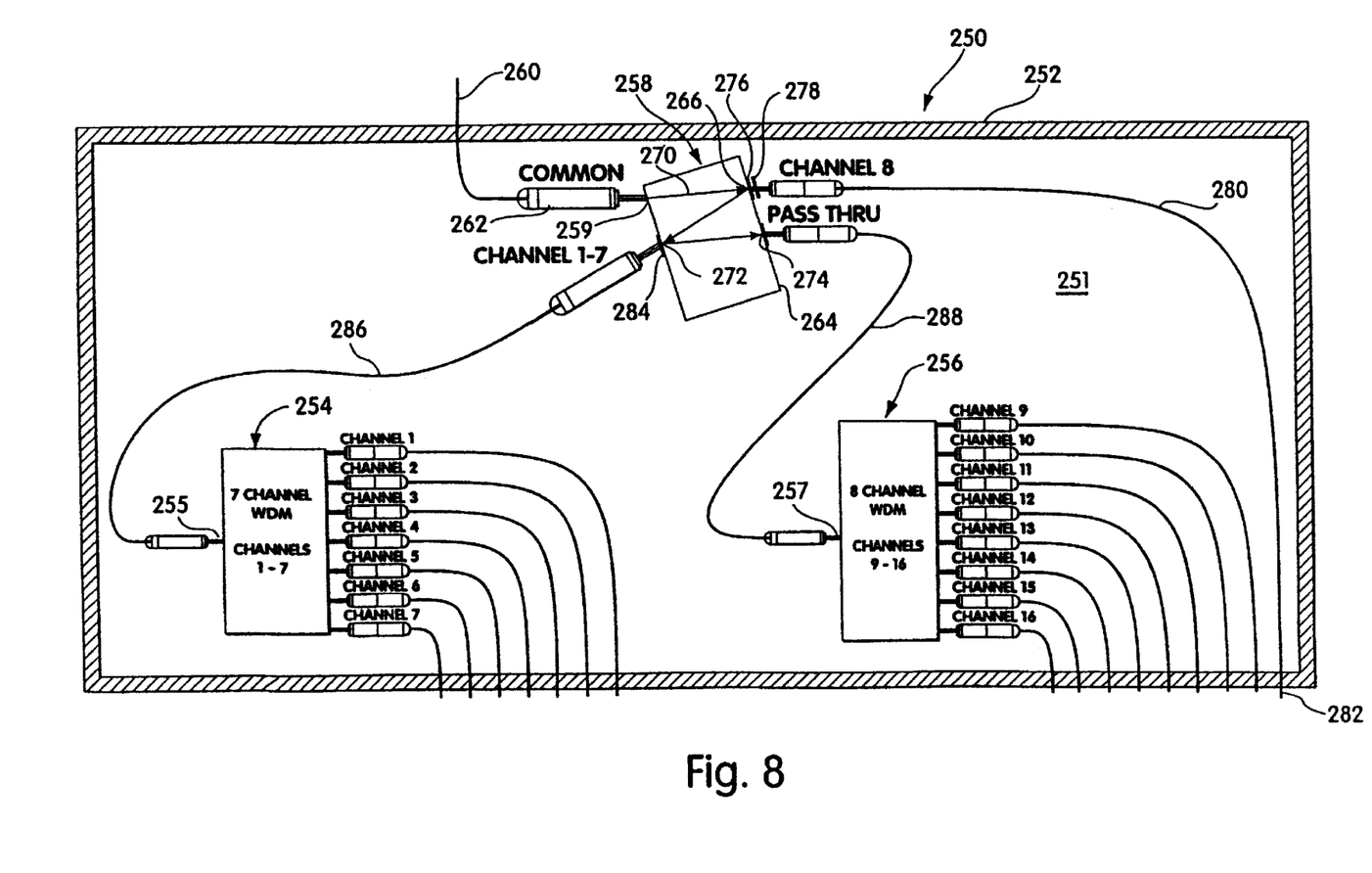
FIG. 8 is a schematic illustration of an alternative preferred embodiment.

An optical multiplexing device 250 in accordance with an alternative embodiment is illustrated in FIG. 8. The optical multiplexing device 250 is seen to be mounted within an enclosed space 251 defined by housing 252. Preferably enclosed space 251 is hermetically sealed by housing 252. The optical multiplexing device comprises a first WDM 254 having a common port 255, and a second WDM 256 having a common port 257. The common ports of the two WDMs are connected in parallel to a red/blue beamsplitter 258. Beam splitter 258 has a common port 259 which receives a multi-channel expanded beam optical signal from a trunkline 260 of a fiber optic telecommunication system or other optical system employing a wavelength division multiplexed signal. More specifically, trunkline 260 is seen to extend through a wall of housing 252 to collimator 262 which directs the signal as an expanded beam into beam splitter 258 at an angle suitable to establish a multi-bounce zig-zag light path within the optical block 264 of beam splitter 258. In accordance with a significant aspect of preferred embodiments in accordance with FIG. 8, a sequentially first channel port 266 of beam splitter 258 removes a mid-channel, that is, a wavelength sub-range which is intermediate the remaining "red" and "blue" portions of the multiplexed signal. In the exemplary embodiment illustrated in FIG. 8, channel 8 is removed at first channel port 266, with channels 1 through 7 then being removed at the next "bounce" along the expanded beam light path 270, that is, at channel port 272. The remaining signals are then passed by optionally unfiltered optical port 274. An optical filter 276 and a post-filter 278 are employed at channel port 266, since adjacent channels 7 and 9 may be present in the expanded beam at that point. The extracted signal corresponding to channel 8 is then fed via waveguide 280, such as a fiber optic line, to an access port 282 passing through the wall of housing 252. Since adjacent channel 8 has been removed prior to channel port 272, only a single optical filter 284 is used there. The multi-channel signal carrying channels 1 through 7 is passed via waveguide 286 to common port 255 of first WDM 254. Similarly, the multiplexed signal comprising channels 9 through 16 is passed via waveguide 288 to common port 257 of the second WDM 256. Each of the individual channel signals multiplexed by the two WDMs is carried by a corresponding waveguide, preferably a fiber optic line, through a corresponding access port in the outer wall of housing 252. Although not employed in the particular embodiment illustrated in FIG. 8, those skilled in the art will recognize in light of the disclosure above of other embodiments, that the first and second WDM in the optical multiplexing device of FIG. 8 could advantageously employ interleaving of the channels.

Figure 9:
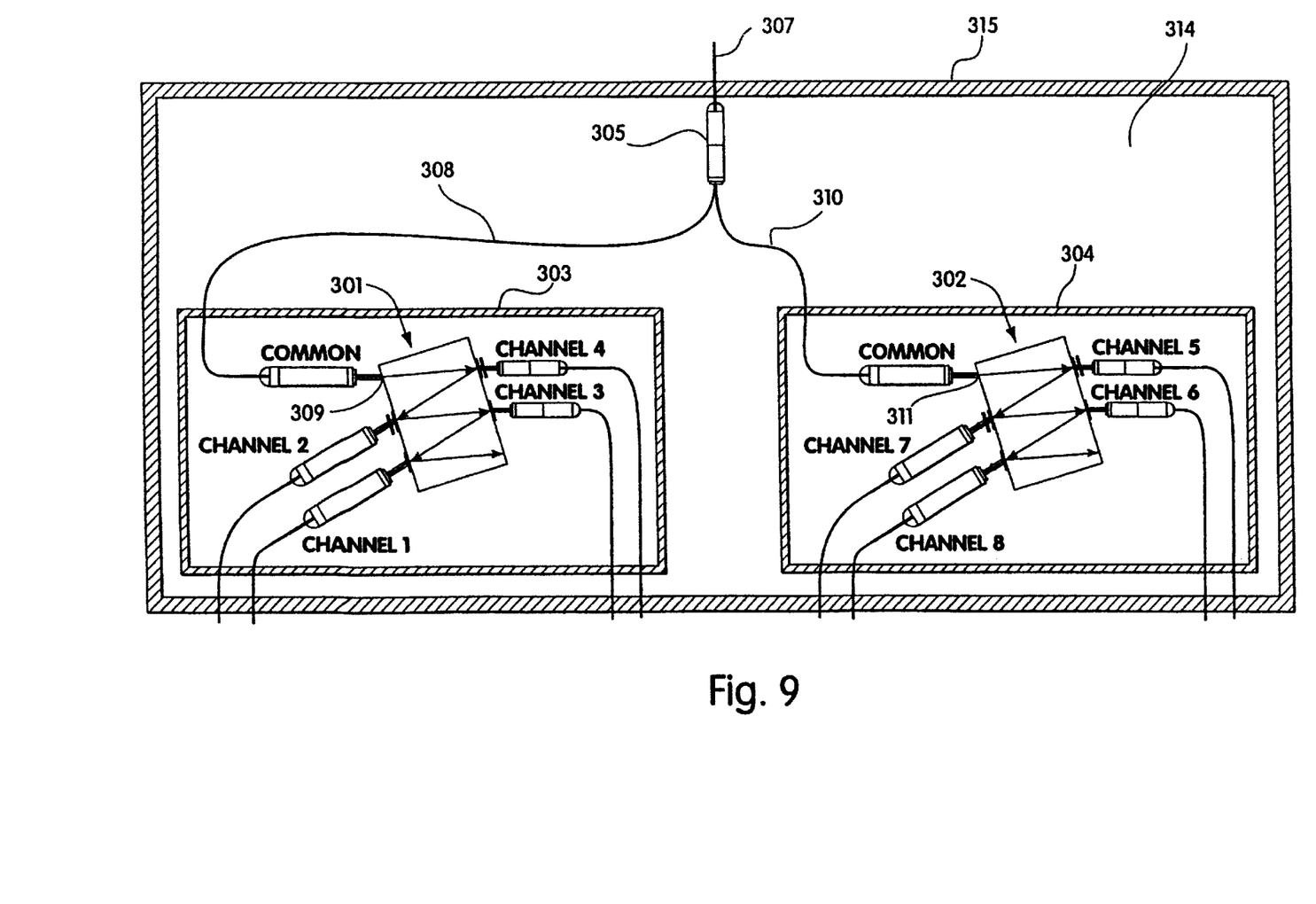
FIG. 9 is a schematic illustration of an alternative preferred embodiment.

An optical multiplexing device in accordance with an alternative embodiment is illustrated in FIG. 9. The optical multiplexing device of FIG. 9 comprises a first WDM 301 which is mounted within housing 303. A second WDM 302 is cascaded parallel with WDM 301 from a passive coupler 305. The second WDM 302 is seen to be mounted with separate housing 304. Passive coupler 305 is optically coupled to a multi-channel trunk line 307 of a fiber-optic telecommunication system employing dense wavelength division multiplexing. The signal from trunk line 307 is split by passive coupler 305. Specifically, the entire 8 channel signal at partial strength is carried by waveguide 308 to common port 309 of WDM 301, while the entire 8 channel signal is carried at partial strength by waveguide 310 to common port 311 of WDM 302. Preferably, the passive coupler 305, waveguides 308 and 310, and housings 303 and 304 containing, respectively, WDMs 301 and 302 along with associated componentry, are all housed within an enclosure 314 defined by housing 315. It can be seen that access ports are provided for feeding trunk line 307 to passive coupler 305, and for carrying the signals associated with individual channels (or multi-channel wavelength sub-ranges) from WDMs 301 and 302 out of housings 303 and 304, and then out of housing 315.

Various suitable passive couplers are commercially available and will be apparent to those skilled in the art in view of this disclosure. A 3 dB coupler may be used, for example, to evenly split the signal strength between the two WDMs. Other passive couplers may be used to unevenly split the signal strength, for example, 60/40, 70/30, etc. Passive couplers may also be employed in tiers, such that a three way, four way or more split of the signal can be achieved. Preferably in all such alternative arrangements, the one or more passive couplers along with the WDMs are mounted within an enclosure defined by a housing corresponding to housing 315 of the embodiment of FIG. 9. In certain preferred embodiments, the outer housing 315, or more preferably, the inner housings 303 and 304, or both, are sealed, e.g., hermetically sealed.

It will be apparent from the above discussion that various additions and modifications can be made to the optical multiplexing devices described here in detail, without departing from the true scope and spirit of this invention. All such modifications and additions are intended to be covered by the following claims.

We claim:

1. An optical wavelength division multiplexing device for demultiplexing a plurality of channels transmitted over an input optical fiber, the plurality of channels being divided into a first group and a second group, the first group and the second group each being composed of a plurality of channels which are distinct from the plurality of channels in the other group, the optical wavelength division multiplexing device comprising:

a first wavelength division multiplexer having a first common port for receiving the plurality of channels from the input optical fiber, a plurality of first ports each transparent to a predetermined channel within the first group and reflective of other channels within the first group and all channels within the second group, and an output port transparent to all channels within the second group;

a waveguide optically coupled to the output port of the first wavelength division multiplexer and transmitting the plurality of channels within the second group exiting the output port of the first wavelength division multiplexer;

a second wavelength division multiplexer having a second common port for receiving the plurality of channels within the second group from the waveguide, and a plurality of second optical ports each transparent to a predetermined channel within the second group and reflective of other channels within the second group, the second common port being optically coupled to the waveguide.

2. The optical wavelength division multiplexing device of claim 1 wherein at least the first wavelength division multiplexer includes an optical block defining a light path, and further wherein at least two of the plurality of first ports includes a filter element transparent to the predetermined channel within the first group and reflective of the other channels within the second group.

3. The optical wavelength division multiplexing device of claim 2 wherein each of the filter elements is a multi-cavity Fabry-Perot interference filter.

4. The optical wavelength division multiplexing device of claim 1 wherein at least the second wavelength division multiplexer includes an optical block defining a light path, and further wherein at least two of the plurality of second ports includes a filter element transparent to the predetermined channel within the second group and reflective of the other channels within the second group.

5. The optical wavelength division multiplexing device of claim 4 wherein the output port is a non-wavelength selective residual port.

6. The optical wavelength division multiplexing device of claim 1 wherein the first wavelength division multiplexer and second wavelength division multiplexer each includes an optical block defining a multi-bounce zigzag expanded beam light path, and further wherein at least two of the first ports and at least two of the second ports include a multi-cavity Fabry-Perot interference filter element transparent to a predetermined channel within the first group and reflective of other channels within the first group to establish a respective bounce point of the expanded beam light path.

7. The optical wavelength division multiplexing device of claim 6 wherein the output port is a non-wavelength selective residual port.

8. The optical wavelength division multiplexing device of claim 7 further comprising:

a collimator disposed between the waveguide and the output port of the first wavelength division multiplexer outside the optical block thereof for collimating light passing between the output port and the waveguide.

9. The optical wavelength division multiplexing device of claim 1 wherein the plurality of first ports of the first wavelength division multiplexer includes at least three interleaved optical ports.

10. The optical wavelength division multiplexing device of claim 9 wherein the plurality of second ports of the second wavelength division multiplexer includes at least three interleaved optical ports.

* * * * *